No. 763,749. PATENTED JUNE 28, 1904.
G. A. GOYDER & E. LAUGHTON.
PROCESS OF EFFECTING THE SEPARATION OF MINERALS.
APPLICATION FILED AUG. 5, 1903.
NO MODEL.
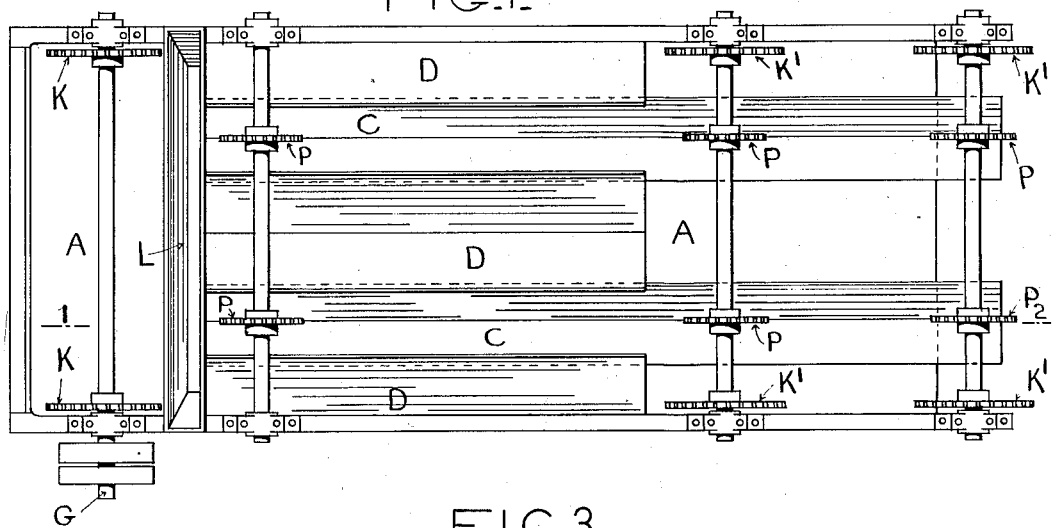
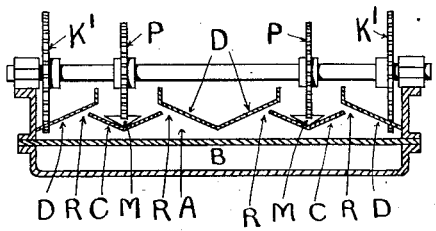
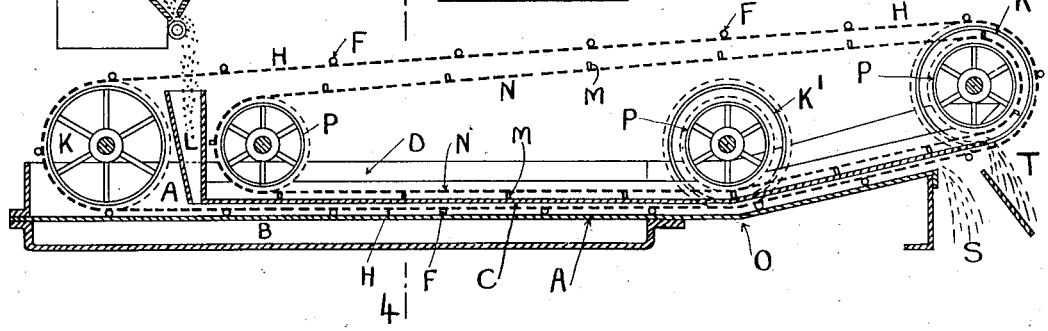
Witnesses:
James L. Norris, Jr.
Inventors
George A. Goyder
Edward Laughton
By James L. Norris.
Atty.

No. 763,749. Patented June 28, 1904.

UNITED STATES PATENT OFFICE.

GEORGE ARTHUR GOYDER AND EDWARD LAUGHTON, OF ADELAIDE, SOUTH AUSTRALIA, AUSTRALIA.

PROCESS OF EFFECTING THE SEPARATION OF MINERALS.

SPECIFICATION forming part of Letters Patent No. 763,749, dated June 28, 1904.

Application filed August 5, 1903. Serial No. 168,333. (No specimens.)

*To all whom it may concern:*

Be it known that we, GEORGE ARTHUR GOYDER, analytical chemist, a resident of No. 2 Pirie street, and EDWARD LAUGHTON, company manager, a resident of Nos. 24-28 Currie street, Adelaide, in the State of South Australia, Commonwealth of Australia, subjects of the King of Great Britain and Ireland, have invented a certain new and useful Process of Effecting the Separation of Minerals, of which the following is a specification.

The object of this invention is to effect the separation of minerals and extract some of them as concentrates.

We have found our mode of operation to be specially effective and valuable in separating zinc-blende from its gangue, consisting principally of quartz and rhodenite. Our invention may also be applied to the separation of some other minerals which are subject to the gas-raising operation hereinafter described.

In giving effect to our invention minerals in a finely-divided state are fed by suitable appliances into a shallow tank or vessel containing a suitable solution—such, for example, as an acidulated one—to which vessel heat may be applied, if required, in any appropriate manner. The result of the physico-chemical action which develops is the formation of gas-bubbles adhering to particles of certain of the finely-divided minerals and causing such particles of certain minerals to rise to or near the surface of the solution. When the gas-bubbles reach the surface of the solution they burst, thus releasing the adhering particles, which being released sink toward the bottom of the vessel. In order to catch these disengaged particles, certain mechanical appliances are introduced into the vessel. These mechanical appliances, which overlie the bottom of the horizontal portion of the vessel where the separation of minerals takes place, consist of inclined planes or deflector-plates, which receive the impact of the rising particles and deflect them from one side or the other of their vertical course upward. Intermediately between the inclined planes or deflector-plates are V-shaped troughs so disposed and arranged that their edges underlie the inclined planes or deflector-plates, with narrow spaces between them. The effect is that as the gas-raised particles of minerals rise from the bottom of the vessel they strike against the inclined under sides of the V-troughs and of the deflector-plates and travel upward in an oblique direction and are guided through the spaces between the submerged troughs and deflector-plates to or near to the surface of the solution. The gas-bubbles then burst, and the disengaged particles of minerals sink vertically in the solution and are caught in the troughs, while the particles of other minerals which are not acted upon by the solution do not rise, but remain at the bottom of the vessel and are called "tailings."

One of the solutions suitable for our purpose is a mixture of four per cent. of sulfuric acid with ninety-six per cent. of water at a temperature of 200° Fahrenheit.

Mechanical devices consisting of endless chains are installed in any appropriate manner in the tank or vessel. To these chains are attached rakes consisting, preferably, of transverse wires at intervals for the purpose of moving the finely-divided minerals and tailings along the bottom of the vessel. Similar mechanical devices with scrapers attached move the concentrates which have been deposited along the trough. The discharge end of the vessel is inclined upward and the tailings are moved by the rakes up this incline and are discharged at the end. The discharge end of the troughs is also inclined upward and the concentrates are moved by the scrapers up this incline and are discharged at the end. The deflector-plates do not extend over the inclined portion of the bottom of the vessel, but the V-troughs extend beyond the whole length of the vessel.

In order that the invention may be properly understood, reference is made to the accompanying sheet of drawings, in which—

Figure 1 is a plan view of the entire apparatus. Fig. 2 is a longitudinal vertical section of the same, taken on the line 1 2 of Fig. 1. Fig. 3 is a transverse vertical section of the apparatus, taken on the line 3 4 of Fig. 2.

E is a hopper for feeding the pulverized ore into the apparatus.

L is a chute into which the pulverized ore will fall from the hopper E, such chute extending downward to a point near the bottom of the shallow tank or vessel A, which will be filled to the top of the deflector-plates with the necessary solution. The bottom of the tank or vessel A is horizontal throughout a portion of its length, but is inclined upward at O toward the discharge end.

Underlying the horizontal portion of the bottom of the vessel A is a steam-jacket B or a flue for the purpose of heating the solution in the tank or vessel A. Overlying (and at a short distance above) the bottom of the tank or vessel A are inclined planes or deflector-plates D, adapted to receive the impact of the gas-raised particles of ore which rise from the bottom of the tank or vessel A and cause such particles to deflect or move to one side or the other of their natural vertical course upward. Intermediately between the inclined planes or deflector-plates D are V-troughs C, so disposed and arranged that their edges shall underlie the inclined planes or deflector-plates D, with small spaces R between them. The result will be that as the gas-raised particles of ore rise from the bottom of the tank or vessel A such particles will strike against the inclined under sides of the V-troughs C and of the deflector-plates D and will be guided through the spaces R between the troughs and the deflector-plates to or near to the surface of the solution in the tank A. The gas-bubbles will there burst, and the particles which had been adhering to them will sink in the solution and be caught in the troughs C.

Certain mechanical devices for causing the finely-divided ore to travel along the bottom of the tank A are illustrated in the drawings. A driving-shaft G is driven in any appropriate manner. On the driving-shaft G are keyed sprocket or chain wheels K, which mesh with endless chains H, that pass under and over guide sprocket or chain wheels K' K'. To these chains are attached transverse rakes F. (Shown only in Fig. 2.) The transverse rakes cause the finely-divided minerals to travel along the bottom of the vessel A, which minerals during their passage are acted upon by the solution contained in the vessel. The rate of speed of the chains and rakes and the rate of feed of the ore into the apparatus will be adjusted to the requirements of the special kind of ore under treatment at the time, so that a maximum quantity of ore relatively to a good concentration will be passed through the apparatus. Similar sprockets P, with their meshed chains N and scrapers M, are employed for withdrawing the concentrates from the V-troughs C. The tailings after they have been depleted of the concentrates will be conveyed by the rakes F to the discharge end S, and the concentrates will be conveyed by the scrapers M to the discharge end T.

The tank A may be supplied with the solution and the latter be maintained at a constant level by a perforated pipe or other convenient means. The solution may be recovered from the tailings and concentrates while washing in an ordinary manner. We do not make any claim to the solution hereinbefore referred to, nor do we wish to claim any particular solution as essential to the working of the invention.

The apparatus is constructed of material not subject to considerable deterioration from the action of the acid or chemicals used and is preferably of copper. The vessel is shown rectangular and may be horizontal, but is preferably partly horizontal and partly sloping upward, as shown in the longitudinal section Fig. 2. It will be sufficient to mention that the apparatus shown in Figs. 1, 2, and 3 is about four feet across; but variations are permissible in the size, the height of the machine, the angles of the inclined planes and troughs, the width of the intervening spaces between the overlapping inclined planes and the troughs, the spacing of the rakes, and other details.

We make no claim to a process of separating metals from pulverized sulfid ores consisting in adding to the same an acid solution which is a non-solvent of the precious metals, then applying heat to the same, and removing the sulfids from the surface of the solution; nor do we claim a process of separating metals from pulverized ores, concentrates, and slimes by mixing an acidulated solution therewith which is a non-solvent of the metal to be separated, stirring, heating, skimming, or floating off such metals from the surface of the whole admixture as they are carried to the surface, so as to recover such concentrates of metal for after treatment; nor do we claim a method of separating sulfid ores from their gangue, which consists in forming a suitable solution containing sulfuric acid to react on the soluble sulfids present to form bubbles of sulfureted hydrogen on the ore particles, and thereby raise them to the surface and removing the ore particles so arranged, as such is not our invention; but, What we do claim as new, and desire to secure by Letters Patent, is—

1. In a method of separating minerals and extracting some of them as concentrates, the steps of moving the ore in a finely-divided state in a solution which by the production of gas causes certain of the minerals contained in said ore to rise; and deflecting and guiding them as they rise, substantially as described.

2. A method of separating minerals and extracting some of them as concentrates, comprising the steps of moving the ore in a finely-divided state in a solution which by the production of gas causes certain of the minerals contained in the said ore to rise; deflecting and guiding them as they rise; and intercepting them in their subsequent descent, substantially as described.

3. A method of separating minerals and extracting some of them as concentrates, which consists in introducing the minerals into a solution adapted to react upon the same, collecting below the surface of the solution such particles of the minerals as are raised by the evolved gas; and discharging them as concentrates, substantially as described.

4. A method of separating minerals and extracting some of them as concentrates, which consists in introducing the minerals into a solution which by the production of gas causes certain of the minerals contained in said ore to rise; applying heat; directing the upward path of the rising particles; and collecting such particles in their subsequent descent, substantially as described.

5. A method of separating minerals and extracting some of them as concentrates, comprising the steps of moving the ore in a solution which by the production of gas causes certain of the minerals contained in the said ore to rise; deflecting and guiding them as they rise; intercepting and collecting them in their subsequent descent; and discharging them as concentrates.

In testimony that we claim the foregoing as our invention we have signed our names, in the presence of two witnesses, this 18th day of June, 1903.

GEORGE ARTHUR GOYDER.
EDWARD LAUGHTON.

Witnesses:
ARTHUR GORE COLLISON,
CHARLES NICHOLAS COLLISON.